US009494088B1

(12) United States Patent
Serrano et al.

(10) Patent No.: US 9,494,088 B1
(45) Date of Patent: Nov. 15, 2016

(54) AVERAGING FILTER FOR SKIP FIRE ENGINE OPERATION

(71) Applicant: Tula Technology Inc., San Jose, CA (US)

(72) Inventors: Louis J. Serrano, Los Gatos, CA (US); Mohammad R. Pirjaberi, San Jose, CA (US); Charles H. Loucks, Santa Clara, CA (US)

(73) Assignee: Tula Technology, Inc., San Jose, CA (US)

(*) Notice: Subject to any disclaimer, the term of this patent is extended or adjusted under 35 U.S.C. 154(b) by 36 days.

(21) Appl. No.: 14/704,747

(22) Filed: May 5, 2015

(51) Int. Cl.
*F02D 17/02* (2006.01)
*F02D 41/00* (2006.01)
*F02D 41/18* (2006.01)
*G01M 15/04* (2006.01)

(52) U.S. Cl.
CPC ........... *F02D 17/02* (2013.01); *F02D 41/0087* (2013.01); *F02D 41/18* (2013.01); *G01M 15/042* (2013.01); *F02D 2041/0012* (2013.01)

(58) Field of Classification Search
CPC .................... F02D 41/0087; F02D 2041/0012; F02D 17/02
USPC ....... 123/406.23, 481, 321, 322, 332, 198 F; 701/112; 702/190
See application file for complete search history.

(56) References Cited

U.S. PATENT DOCUMENTS 4,434,767 A 3/1984 Kohama et al.
4,489,695 A 12/1984 Kohama et al.
4,509,488 A 4/1985 Forster et al.
5,377,631 A 1/1995 Schechter
5,426,704 A * 6/1995 Tamamura ......... G10K 11/1784 381/71.11
5,512,024 A * 4/1996 Burton .................. B60W 10/06 477/102
5,753,804 A 5/1998 La Palm et al.
6,158,411 A 12/2000 Morikawa
6,591,666 B1 7/2003 Kacewicz et al.
6,619,258 B2 9/2003 McKay et al.
6,636,796 B2 10/2003 Kolmanovsky et al.
6,873,941 B2 3/2005 Doelker
6,885,932 B2 * 4/2005 Liu ........................ G01M 15/11 123/357
7,063,062 B2 6/2006 Lewis et al.
7,066,136 B2 6/2006 Ogiso
7,086,386 B2 8/2006 Doering
7,503,312 B2 3/2009 Surnilla et al.
7,930,087 B2 4/2011 Gibson et al.
8,286,471 B2 10/2012 Doering et al.
2007/0091995 A1 * 4/2007 Ibragimov ......... H03H 21/0012 375/233
2010/0012072 A1 1/2010 Leone et al.
(Continued)

*Primary Examiner* — Mahmoud Gimie
(74) *Attorney, Agent, or Firm* — Beyer Law Group LLP

(57) ABSTRACT

A variety of methods, devices and filters are described that are suitable for averaging measured power train operating parameters over a period that varies as a function of an engine cylinder firing characteristic such as a current operational firing fraction or firing sequence. The averaged measured operating parameter may be used in a variety of different engine control related functions, calculations and/or operations. The described techniques and devices are particularly well suited for use during skip fire operation of an engine.

19 Claims, 6 Drawing Sheets

(56) References Cited

U.S. PATENT DOCUMENTS

| | | | | |
|---|---|---|---|---|
| 2010/0031738 | A1* | 2/2010 | Feldkamp | G01M 15/042<br>73/114.79 |
| 2010/0050993 | A1 | 3/2010 | Zhao et al. | |
| 2012/0109495 | A1* | 5/2012 | Tripathi | F02D 41/30<br>701/102 |
| 2012/0143471 | A1* | 6/2012 | Tripathi | F02D 28/00<br>701/102 |
| 2013/0092128 | A1* | 4/2013 | Pirjaberi | F02D 41/0087<br>123/406.23 |
| 2014/0207359 | A1 | 7/2014 | Phillips | |
| 2014/0270189 | A1* | 9/2014 | Atkins | H04S 3/00<br>381/17 |

* cited by examiner

AVERAGING FILTER FOR SKIP FIRE ENGINE OPERATION

BACKGROUND

The present invention relates generally to engine control during operation of an internal combustion engine using less than all of the available working chambers. More particularly, the invention relates to the use of an averaging filter that varies as a function of the firing fraction on various engine/power train measurements that may oscillate at a frequency/period related to the firing fraction.

A number of engine operating parameters are sensed during operation of an engine and are used directly or indirectly in various control schemes. By way of example, some of the sensed operating parameters include engine speed (RPM); various intake air measurements such as intake manifold pressure (MAP) or intake mass airflow (MAF); cam or camshaft position, phase or speed; etc. Other engine operating parameters sometimes used in engine control, such as mass air charge (MAC) are typically calculated on the other basis of other inputs often including one or more of the foregoing measured parameters.

During normal, all-cylinder engine operation, the actual engine speed and intake air measurements such as manifold pressure may vary slightly over the course of an engine cycle. For example, small variations in the engine speed will occur due to the varied forces applied to the crankshaft as the pistons transition through their respective working cycles. If unaccounted for, these variations can cause problems in various control schemes and algorithms. These variations tend to be relatively small and occur at a frequency equivalent to the frequency of the firing opportunities as illustrated in FIG. 1. Since the variations are high frequency and relatively consistent, they can readily be filtered out using a simple low pass filter.

The Applicant has developed a technology for improving the fuel efficiency of an engine by operating the engine in a dynamic skip fire mode. In general, skip fire engine control contemplates selectively skipping the firing of certain cylinders during selected firing opportunities. Thus, a particular cylinder may be fired during one engine cycle and then skipped during the next engine cycle and selectively skipped or fired during the next. Skip fire engine operation is distinguished from conventional variable displacement engine control in which a designated set of cylinders are deactivated substantially simultaneously and remain deactivated as long as the engine remains in the same variable displacement mode. Thus, the sequence of specific cylinders firings will always be exactly the same for each engine cycle during operation in a variable displacement mode, whereas that is often not the case during skip fire operation. For example, an 8 cylinder variable displacement engine may deactivate half of the cylinders (i.e. 4 cylinders) so that it is operating using only the remaining 4 cylinders. Commercially available variable displacement engines available today typically support only two or at most three fixed mode displacements. In general, skip fire engine operation facilitates finer control of the effective engine displacement than is possible using a conventional variable displacement approach. For example, firing every third cylinder in a 4 cylinder engine would provide an effective displacement of $1/3^{rd}$ of the full engine displacement, which is a fractional displacement that is not obtainable by simply deactivating a set of cylinders.

During skip fire operation, the engine speed and air intake measurements tend to vary more significantly from firing to firing and occur at lower frequencies due to the fact that the actual firing events happen less frequently and tend to utilize larger air and fuel charges.

Although conventional techniques for filtering sensed engine operating parameters work well, they don't tend to work as well during skip fire operation. The present application describes techniques for averaging and/or filtering sensed operating parameters that are particularly well suited for use during skip fire operation of an engine.

SUMMARY

A variety of methods, devices and filters are described that are suitable for averaging measured power train operating parameters over a period that varies as a function of an engine cylinder firing characteristic such as a current operational firing fraction or firing sequence. The averaged measured operating parameter may be used in a variety of different engine control related functions, calculations and/or operations. The described techniques and devices are particularly well suited for use during skip fire operation of an engine.

In some embodiments, the averaging period varies with changes in the operational firing fraction in accordance with a denominator of the then current firing fraction. In specific embodiments, the averaging period is a number of firing opportunities equal to a denominator of the current irreducible firing fraction. In other embodiments, the averaging period may correspond to a repeating specific cylinder firing sequence length.

The described averaging may be applied to a variety of different measured operating parameters including, engine speed, intake air measurements, a cam or camshaft position or speed measurement, etc. The measured parameters may be used in a variety of engine control related functions. They may also be used in the calculation of values used in various engine control functions, such as the calculation of a mass air charge (MAC) and/or the determination of a desired operational firing fraction.

In some embodiments, the selected engine operating parameter is sampled at a sample rate of once per firing opportunity or an integer multiple thereof.

A variety of filters may be designed to perform the averaging. In some embodiments, the filter takes the form of a finite impulse response (FIR) filter. One suitable implementation takes the form of a tapped delay line.

In another aspect, a variable filter that is particularly well suited for use during operation of an engine using less than all of the available cylinders. The variable filter is arranged to maximize attenuation at a fundamental frequency associated with a current operational engine speed and a current operational firing sequence or firing fraction. In some implementations, the filter is a notch filter having a notch at the fundamental frequency.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

A number of engine operating parameters are sensed during operation of an engine and are used directly or indirectly in various control schemes. By way of example, some of the sensed operating parameters include engine speed (RPM); various intake air measurements such as intake manifold pressure (MAP) or intake mass airflow (MAF); cam or camshaft position, phase or speed; etc. Other engine operating parameters sometimes used in engine control, such as mass air charge (MAC) are typically calculated on the basis of other inputs often including one or more of the foregoing measured parameters.

During normal, all cylinder engine operation, the actual engine speed and intake air measurements such as manifold pressure may vary slightly over the course of an engine cycle. For example, small variations in the engine speed will occur due to the varied forces applied to the crankshaft as the pistons transition through their respective working cycles. These variations tend to be relatively small and occur at a frequency equivalent to the frequency of the firing opportunities.

Figure 1A:
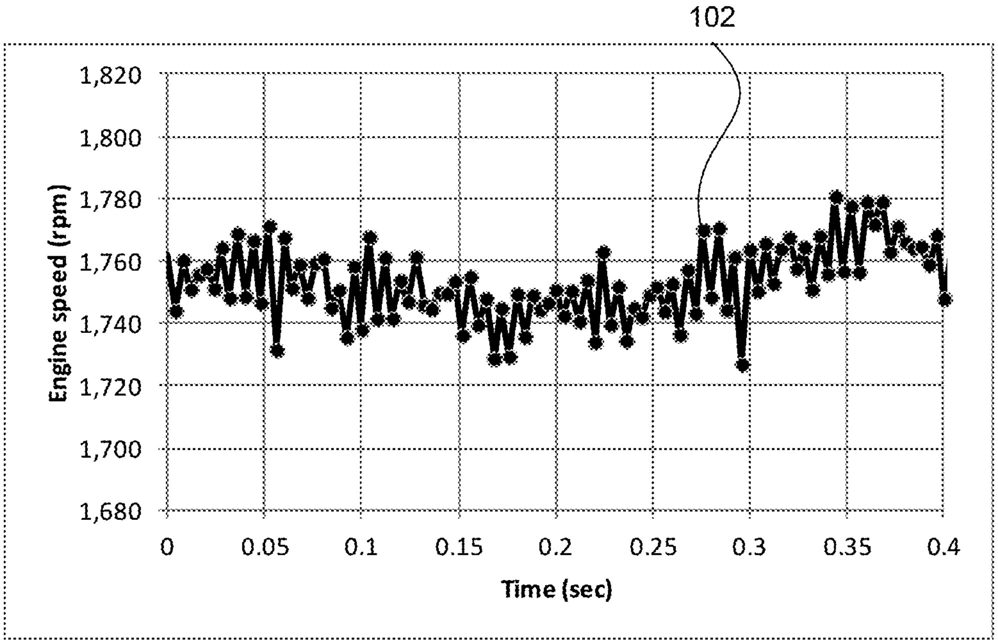
FIG. 1A is a graph illustrating unfiltered engine crankshaft speed during normal, all cylinder operation of an engine.
Figure 1B:
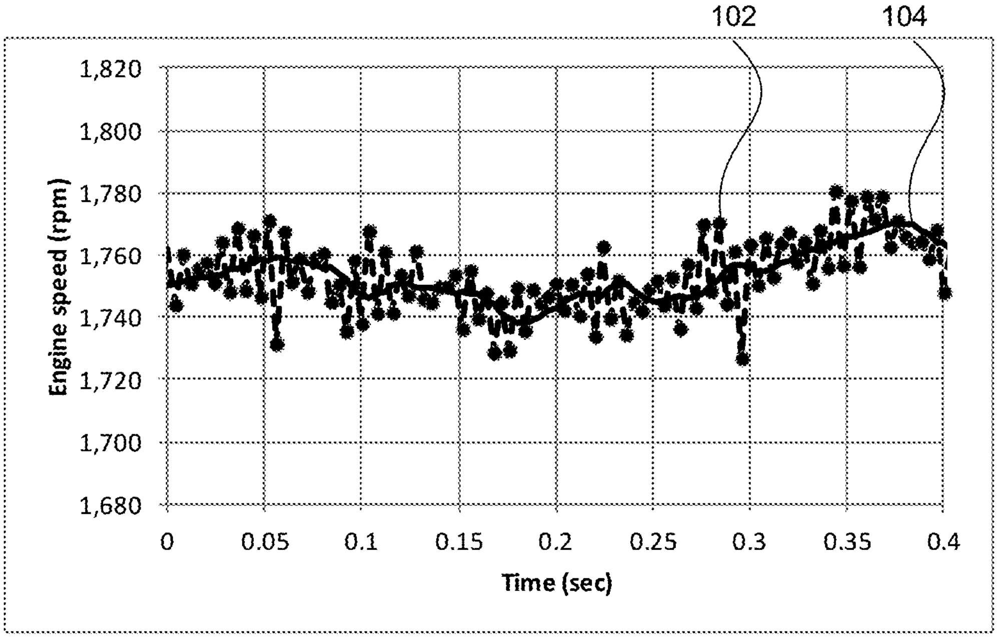
FIG. 1B is a graph comparing unfiltered and low-pass filtered engine crankshaft speed during normal, all cylinder operation of an engine.

FIG. 1A shows the unfiltered engine speed signal 102 as a function of time for an 8 cylinder, 4-stroke engine firing on all cylinders under substantially steady-state conditions at an engine speed of approximately 1750 rpm. Since the variations are high frequency (approximately 117 Hz, 4 firings per revolution at 1750 rpm) and relatively consistent, they can readily be filtered out using a simple low pass filter. FIG. 1B compares the unfiltered engine speed signal 102, with a filtered output 104 obtained by filtering signal 102 through a 4-pole, low pass Butterworth filter with a 20 Hz cut off frequency. Inspection of FIG. 1B illustrates the effectiveness of the low pass filter in removing the high frequency noise on the engine speed signal. Note that low pass filtering may also be helpful in reducing the impact of measurement noise that may be present on the unfiltered engine speed signal 102.

Figure 2A:
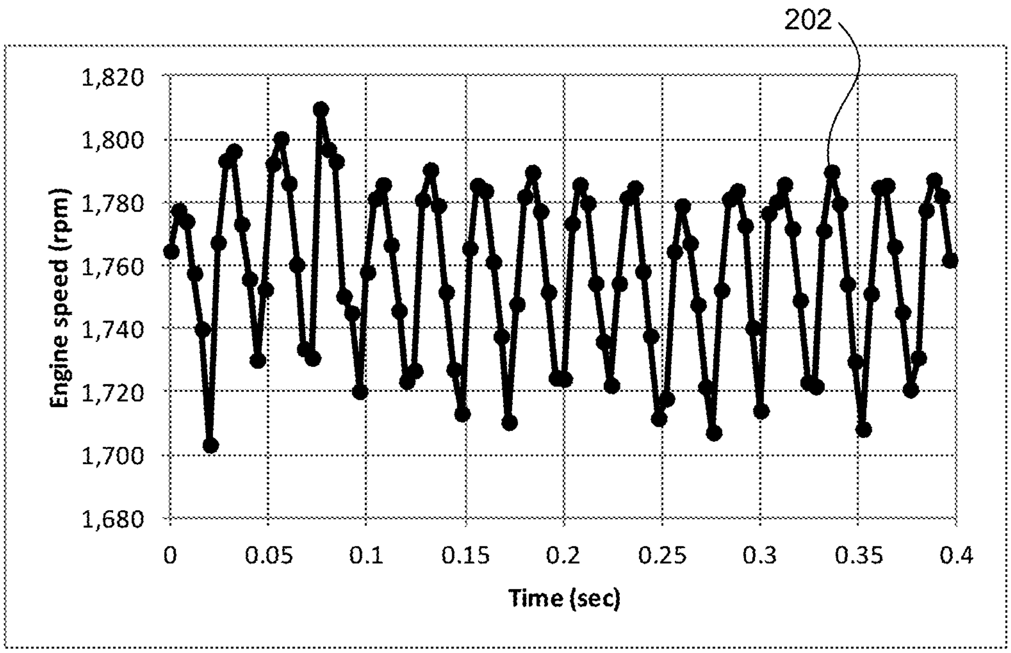
FIG. 2A is a graph illustrating unfiltered engine crankshaft speed during skip fire operation of an engine at a firing fraction of ⅓ using evenly spaced firings.

During skip fire operation the engine speed and air intake measurements tend to vary more significantly from firing to firing and occur at lower frequencies due to the fact that the actual firing events happen less frequently. Consider for example operation of the engine at a firing fraction of ⅓. When a first cylinder is fired, the engine speed will typically increase a bit due to the combustion event. Over the course of the next two firing opportunities the engine speed will tend to slow somewhat until the next firing occurs at which the cycle repeats. Thus, there tends to be an oscillation in engine speed at a rate of ⅓$^{rd}$ the frequencies of the firing opportunities as illustrated in FIG. 2A. FIG. 2A shows the unfiltered engine speed signal 202 as a function of time for a representative 8 cylinder, 4-stroke engine operating at a firing fraction of ⅓$^{rd}$ under substantially steady-state conditions at an engine speed of approximately 1750 rpm. The engine speed in FIG. 2A is substantially the same engine speed shown in FIG. 1A. Note the scales on the FIGS. 1A and 2A are identical, so they can be easily compared.

Figure 2B:
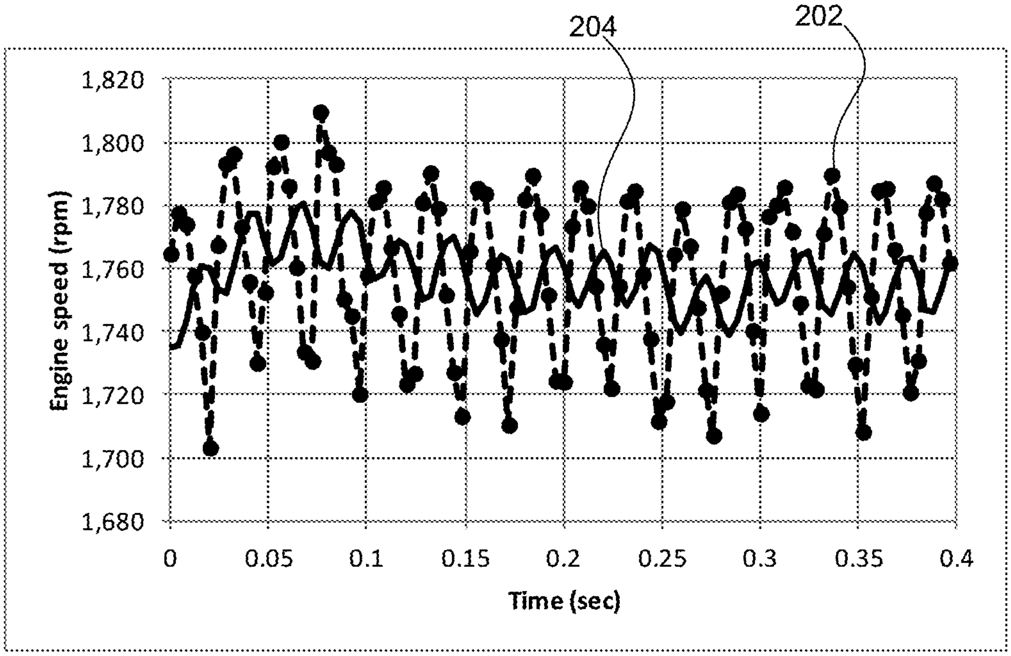
FIG. 2B is a graph comparing unfiltered and low-pass filtered engine crankshaft speed during skip fire operation of an engine at a firing fraction of ⅓.

FIG. 2B compares the unfiltered engine speed signal 202 and a low-pass filtered signal 204 through a four-pole, Butterworth filter with a 20 Hz cut off frequency. While the magnitude of the signal oscillation has been reduced, it is apparent that there is still signal significant variation in the low-pass filtered signal 204. When measured at a sample rate equivalent to the rate of firing opportunities or higher, the variations in signal 204 are significant enough to cause problems for many control algorithms that are based at least in part on engine speed because the measured engine speed varies significantly between firings.

Similar firing frequency induced oscillations can occur in other measurements as well. For example, manifold pressure will tend to vary based on the opening and closing of the intake valves associated with fired working cycles (or with cylinder air filling events). In some circumstances there may also be variations in cam/camshaft phase due to the different reactive forces applied to the camshaft when opening valves (particularly exhaust valves) associated with fired cylinders.

For control purposes, it is generally desirable to use the average speed over the period of oscillation rather than the instantaneous RPM values when the engine is operating under substantially steady state conditions. As previously mentioned, during all cylinder operation, this can readily be accomplished through the use of a low pass filter which effectively eliminates the impact of the high frequency variations. Although the same approach can be used during skip fire operation, it tends to provide inadequate filtering. One reason for the reduced filtering is the lower fundamental frequency of the firings that can occur during skip fire operation. For example, a four-stroke V8 engine operating at a firing fraction of ⅕, ⅖, ⅗ or ⅘ at 1500 RPM has a fundamental frequency of 20 Hz and operation at a firing fraction of ¼ or ¾ has a fundamental frequency of 25 Hz. Operation at a ⅓ or ⅔ firing fraction has a fundamental frequency of 33 Hz. In contrast, the same engine operating in an all cylinder mode at the same speed has a fundamental frequency of 100 Hz.

Figure 3:
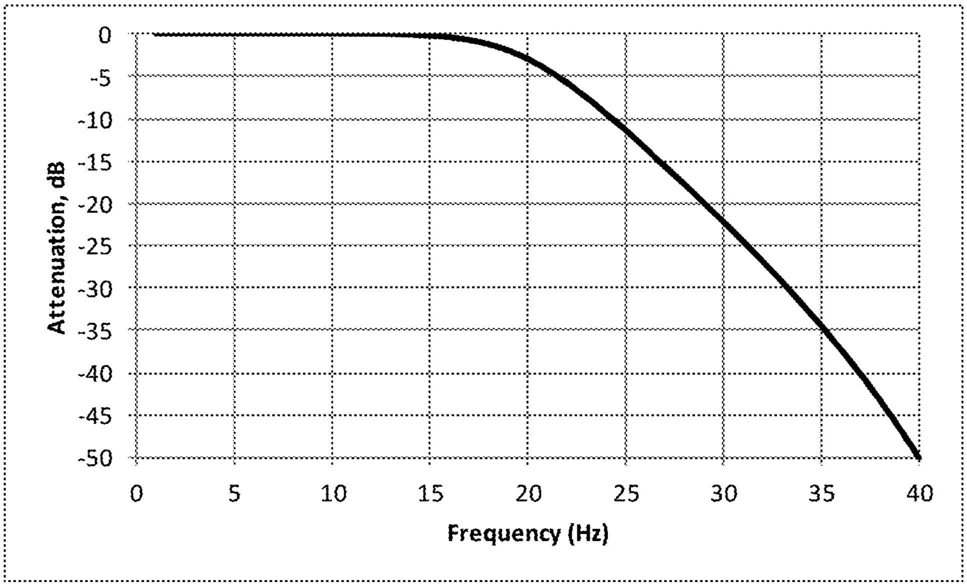
FIG. 3 is a graph showing the attenuation of a representative 20 Hz low pass filter over a range of input frequencies.

Conventionally, something on the order of a 20 Hz low pass filter might be used to filter the engine speed. The performance of a representative, state of the art, 4-pole, 20 Hz low pass Butterworth filter is diagrammatically illustrated in FIG. 3. As seen therein, the attenuation is quite good at higher frequencies. However, as the frequency gets closer to 20 Hz, the attenuation may be relatively small. For example, at 20 Hz, the attenuation is only about 3 dB—which corresponds to an attenuation of only about 30 percent (i.e., passing approximately 70% of the input variation). At 25 Hz, the attenuation is approximately 11 dB, which still passes approximately 27% of the input variation and at 33 Hz the attenuation is approximately −29 dB, which still passes approximately 3.4% of the input variation.

In addition to the incomplete filtering, low pass filters also have associated phase lags. Thus, the filtered output is more representative of past engine speeds than the current engine speed. Excessive phase lag complicates the engine speed control algorithms and can result in sluggish speed control to avoid instabilities.

It can be seen that while a 20 Hz low pass filter works well to eliminate variations that occur at 100 Hz, it doesn't work particularly well to remove the types of oscillations that occur at many of the fundamental frequencies that are common during skip fire operation. In theory, one could use a lower frequency low pass filter. However, the use of a low pass filter having a corner frequency low enough to effectively mitigate oscillations that occur at the lower fundamental frequencies associated with skip fire operation are not practical since they would unduly delay the detection of changes that occur due to changed driving conditions, i.e. the phase lag issue previously described. In addition, a low corner frequency may attenuate information in the signal that it is desirable for proper engine control.

Figure 4:
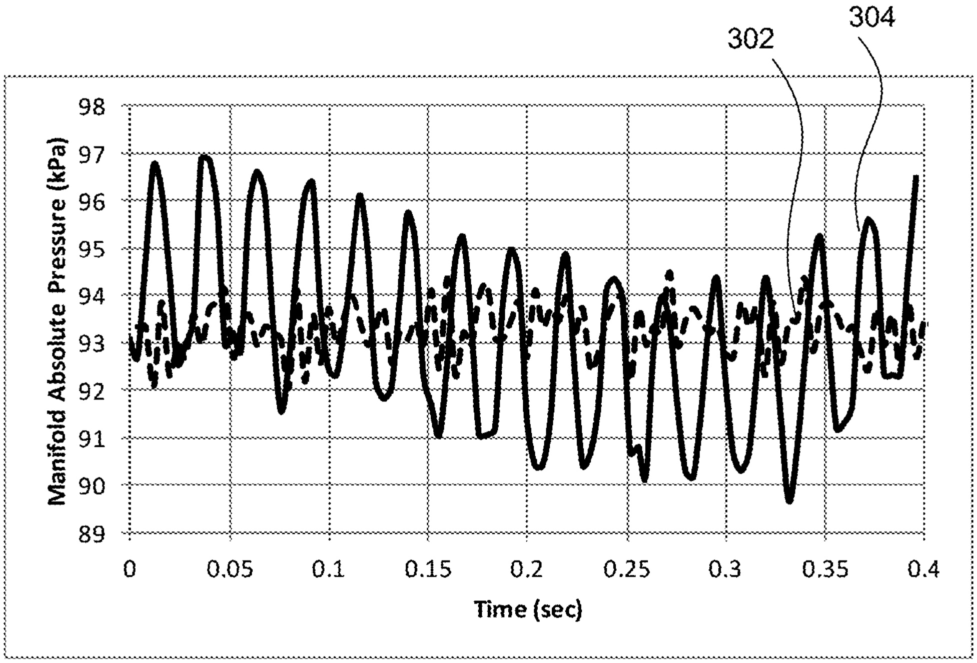
FIG. 4 is a graph illustrating the intake manifold absolute pressure for all cylinder operation and operating at a firing fraction of ⅓.

In addition to the engine speed, a variety of other vehicle parameters may display oscillatory behavior at frequencies near the fundamental frequency of the firing pattern. For example, the manifold absolute pressure (MAP) displays such behavior. FIG. 4 compares variations in the manifold pressure of an engine operating using all cylinders (curve 302), to the manifold pressure during skip fire operation of the same engine at a firing fraction of ⅓ (curve 304). The operating conditions are identical to those depicted in FIGS. 1A and 2A. It can readily be seen that the manifold pressure variations are more pronounced and occur at a lower frequency during all cylinder operation.

As previously mentioned, the Applicant has developed a technology for improving the fuel efficiency of an engine by operating an engine in a dynamic skip fire mode. In many implementations, operation is constrained to the use a fixed set of firing fractions. Although the available set of firing fractions may vary based on a number of factors including the engine in question and various operational conditions the set of available firing fractions is generally known. By way of example, in some implementations, the set of available skip fire firing fractions is the set of irreducible fractions having a denominator of not greater than nine (9) or a subset thereof (e.g., 1/9, ⅛, 1/7, ⅙, ⅕, 2/9, ¼, 2/7, ⅓, ⅜, ⅖, 3/7, 4/9, ½, 5/9, 4/7, ⅗, ⅝, ⅔, 5/7, ¾, 7/9, ⅘, ⅚, 6/7, ⅞, 8/9 or a subset thereof). In other implementations, the available firing fractions may be the set, or a subset of the irreducible fractions having a lower denominator such as 3, 4, 5, or 7.

To avoid the problems associated with a low pass filter, one embodiment of present invention proposes the use of a variable averaging filter in which the length of the filter is set to equal the denominator of the firing fraction. With this approach, the length of the averaging filter will correspond to the period of the firing pattern. It is noted that the lowest order fundamental frequency associated with skip fire operation is based on the denominator of the irreducible firing fraction. For example, firing fractions of ⅕, ⅖, ⅗ and ⅘ all have the same fundamental frequency, which is ⅕ of the frequency of the firing opportunities. It has been observed that averaging control variables that are affected by skip fire operation such as engine speed, manifold pressure, etc. over the period of the lowest order fundamental frequency can significantly improve control performance.

The actual sample rate used for any particular control function may vary. However, for many applications, a variable sample rate equal to the frequency of the firing opportunities, or an integer multiple thereof, simplifies the control algorithms and works particularly well. When the sample rate is equal to the frequency of the firing opportunities, then the averaging is performed over a number of samples that corresponds to the denominator of the irreducible firing fraction. If the sample rate is an integer multiple of the frequency of the firing opportunities, then the averaging is performed over a number of samples that correspond to that integer multiple times the denominator of the irreducible firing fraction.

Eight cylinders engines typically have a firing opportunity every ninety degrees (90°) of crankshaft rotation. In such embodiments, a sample rate corresponding to the firing opportunities would result in a sample every 90° of crankshaft rotation. Many engine control systems are arranged to sample at a rate that is based on the passing of timing marks rotating with an engine crankshaft. For example, some timing systems have marks spaced 6° apart and therefore sample every 6° of crankshaft rotation. An eight cylinder engine having a sampling rate every 6° of crankshaft rotation would have 15 samples per firing opportunity. In such a system, the appropriate averaging length would be 15 times the denominator of the irreducible firing fraction.

Figure 5:
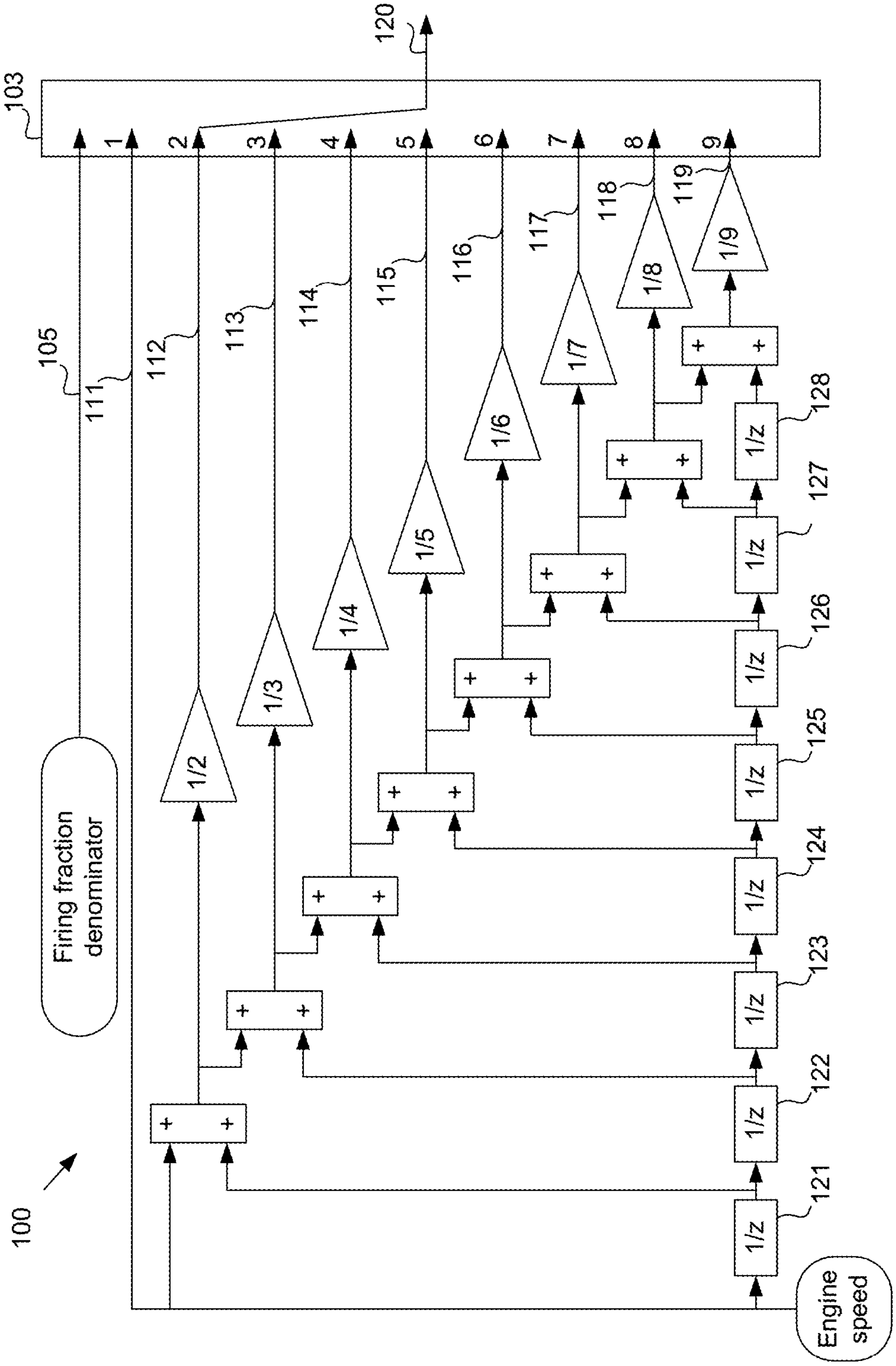
FIG. 5 diagrammatically illustrates a tap delay line averaging filter that utilizes the denominator of the firing fraction as the selector.

The averaging filter can be implemented in a wide variety of different manners including algorithmically, using circuitry, logic, etc. By way of example, FIG. 5 diagrammatically illustrates a tapped delay line having a sample rate equal to the frequency of the firing opportunities that may be used as the averaging filter. The tapped delay line 100 is arranged to handle firing fractions having a denominator of one through nine—that is, from all cylinder operation (denominator 1) to a firing fraction of n/9 where n is an integer between 1 and 8. The tapped delay line 100 has eight delay units 121 to 128. The tapped delay line 100 has a tap before delay unit 121, between each delay unit, and after delay unit 128 for a total of 9 taps. An input to tapped delay line 100 is engine speed at a sampling rate z equal to the frequency of the firing opportunities. The tapped delay line 100 conceptually averages the input over 1 to 9 samples in tap lines 111 to 119 respectively. The tap lines are input to a multiplexer 103 which chooses the appropriate averaging period based on selector input 105, which is the denominator of the irreducible firing fraction. Thus, the tapped delay line 100 serves as a variable averaging filter whose averaging period corresponds to the fundamental frequency associated with skip fire operation.

Figure 6:
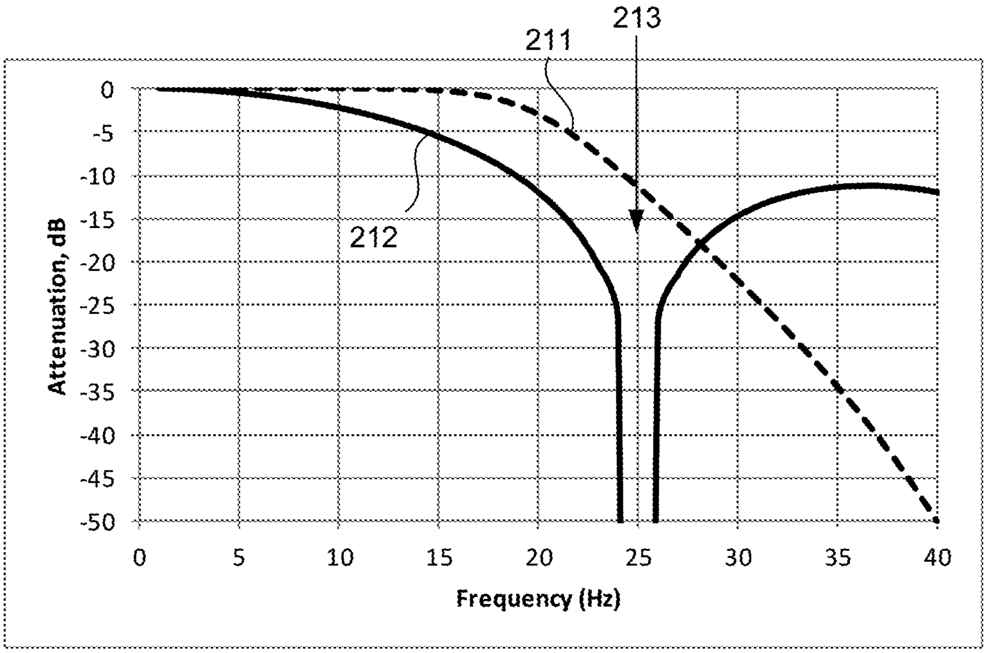
FIG. 6 is a graph comparing the frequency response of an averaging filter in accordance with an embodiment of the present invention to a low pass filter.

FIG. 6 compares the frequency response of the described averaging filter (line 212) to the frequency response of a state of the art 20 Hz low pass filter (line 211). It can be seen that the described averaging filter has much better attenuation at 25 Hz—which is the fundamental frequency associated with operating an engine at an engine speed resulting in 100 firing opportunities per second at an irreducible firing fractions having a denominator of 4 (i.e., ¼ and ¾). The first null/notch in the averaging filter frequency response 213 will vary with the engine speed and firing fraction denominator such that the fundamental oscillation at the firing frequency will always be cancelled. The filtering works well at any engine speed because the sample rate is based on engine speed. Since the averaging period varies as a function of the firing fraction denominator, similar attenuation results are provided with respect to the fundamental frequencies associated with other firing fractions as well.

Figure 7:
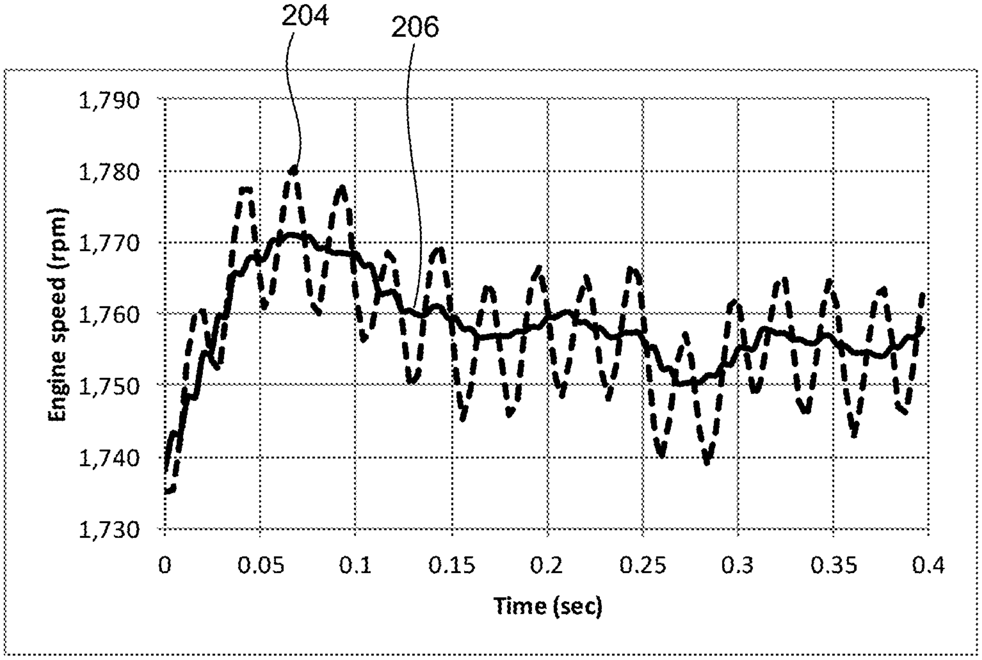
FIG. 7 is a graph comparing low-pass filtered and averaging filtered engine crankshaft speed during skip fire operation of an engine at a firing fraction of ⅓.

FIG. 7 compares the low-pass filtered and averaging filtered engine crankshaft speed under the same conditions as shown in FIGS. 2A and 2B. The low-pass filtered signal 204 is identical to that shown in FIG. 2A. The averaging filtered signal 206 is the resultant signal using the tapped delay line filter 100 shown in FIG. 5. Inspection of FIG. 7 shows that the oscillatory behavior evident in low-pass filtered signal 204 is absent in averaging filtered signal 206. The averaging filtered signal 206 thus provides a better signal for use in various engine control algorithms.

Figure 8:
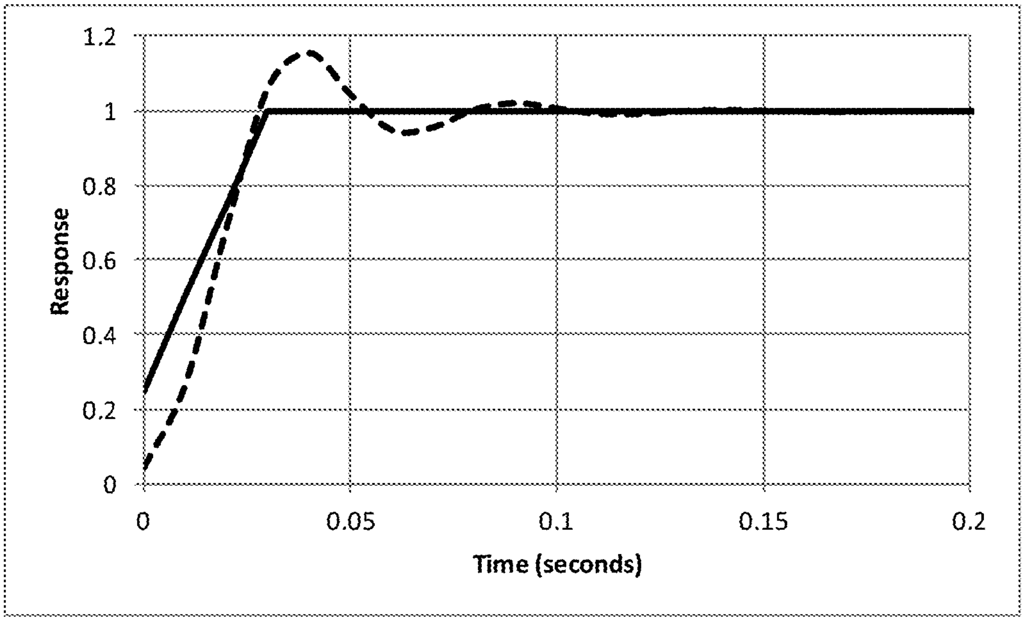
FIG. 8 is a graph comparing the time response to a step input of an averaging filter in accordance with an embodiment of the present invention to the response of a low pass filter.
Figure 9:
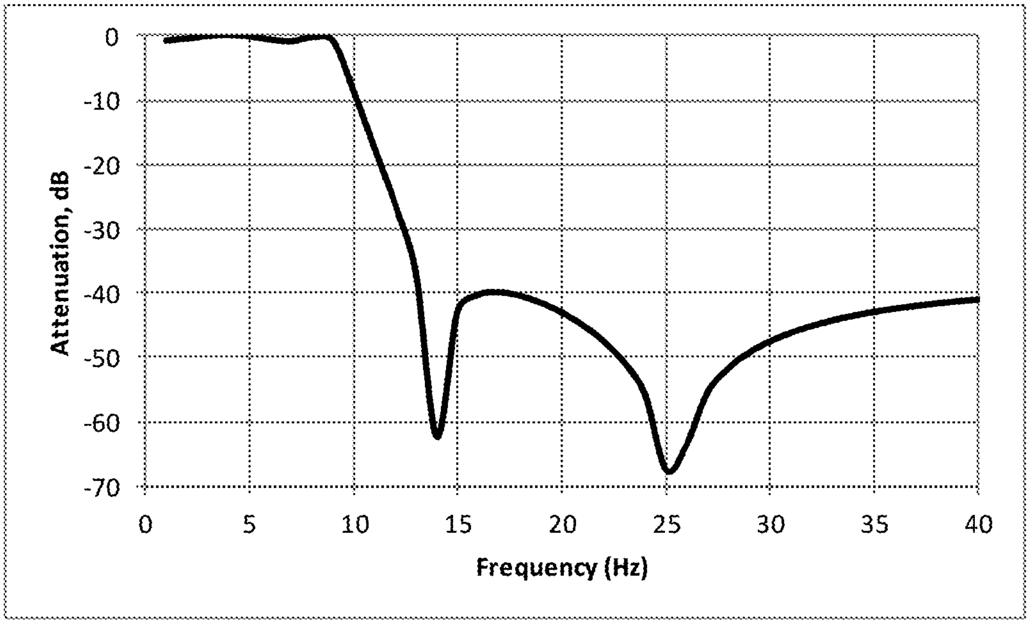
FIG. 9 is a graph showing the attenuation of a fourth order elliptical IIR filter that heavily attenuates at 25 Hz.

Time domain response is another characteristic that is important in filter design. FIG. 8 compares the time domain response to a step input associated with the described averaging filter (line 211) to the time domain response of a state of the art 20 Hz low pass filter (line 212) to the same step input. It can be seen that the time domain response of the averaging filtered is improved relative to the low-pass filter. It also displays no oscillatory behavior.

As will be appreciated by those familiar with filter design, the illustrated tapped delay line illustrated in FIG. 5 is a finite impulse response (FIR) filter. A feature of the illustrated tap delay line approach is that when the firing fraction changes, no transient occurs since the state of the filter (the tapped delay line) is unchanged by the different fractions.

When a firing fraction change is made, the transition between firing fractions tends to disrupt the cyclical patterns that occur when operating at a set firing fraction. As such, the averaging filter's performance is not as effective during transitions as it is during steady state operation at a fixed firing fraction. Some of the skip fire controllers developed by the applicant change firing fractions relatively often to help improve fuel efficiency. Therefore, effective transition management schemes are desirable.

In some embodiments, the averaging filter is disabled during transitions. When the averaging filter is disabled, a conventional low pass filter may optionally be used in its place during the transition.

If the averaging filter is utilized during firing fraction transitions, the selector for the averaging filter may be changed to the target firing fraction as soon as a firing fraction change is commanded. In other embodiments, the change may be delayed until the transition has been completed, for a set number of engine cycles or for a time period that varies with engine speed. In other embodiments, the described averaging filter may be used in series with a more conventional low pass filter to help mitigate transient variations during transitions or a compromise value can be used to perform the averaging.

The described averaging filter works well for filtering a variety of engine control parameters during skip fire operation such as engine speed (RPM); various intake air measurements such as intake manifold pressure (MAP), intake mass airflow (MAF); cam or camshaft position, phase or speed; etc. The averaged measurement values can then be used in any suitable control algorithm or in the calculation of other engine parameters.

An exemplary operational parameter calculation that can benefit from the described approach is the calculation of mass air charge (MAC). As will be appreciated by those familiar with the art, a number of engine operating parameters influence the amount of air that is actually introduced into a cylinder during any particular working cycle (MAC). Some of the more influential factors that can be measured or are otherwise typically known by the engine controller include cam phase and timing, engine speed (RPM), manifold air pressure (MAP) and the mass flow rate of air entering the engine (MAF). Averaging each of these inputs using the described approach can help improve MAC calculations. During skip fire operation, the firing history can also have a significant impact on the actual air charge. For example, with other influences being equal, the amount of air introduced into a cylinder that was skipped in the previous working cycle(s) will be greater (and potentially significantly greater) than if the cylinder was fired in the previous working cycle—primarily due to the cooling of the cylinder that occurs during the preceding skipped working cycle(s). U.S. patent application Ser. No. 13/794,157 describes a variety of techniques for estimating mass air charge during skip fire operation. U.S. patent application Ser. No. 13/843,567 describes various skip fire control approaches that utilize firing history in the determination of the MAC, fuel charge or other combustion control parameter. Any of those air charge calculations can benefit from the use of the described averaging filter.

Another exemplary operational parameter that can benefit from the described approach is the determination of the firing fraction. As described in U.S. patent application Ser. Nos. 13/654,244, 13/963,686 and 14/638,908, the allowed firing fractions may vary as a function of the engine speed. Properly filtering the engine speed facilitates an accurate determination of allowable firing fractions and reduces the probability of unnecessary firing fraction changes.

Although the fundamental frequency associated with skip fire operation tends to be based on the denominator of the firing fraction, there are other frequencies that can be of concern as well. For example, there may be variations that occur based on the specific cylinders that are being fired. When the length of the firing sequence is not a mathematical factor of the number of cylinders, the same cylinders will be fired in the same order in a repeating pattern equal to the denominator of the firing fraction times the number of cylinders. Such a repeating sequence of specific cylinder firings is sometimes referred to herein as a "repeating specific cylinder firing sequence." For example, operation of an 8 cylinder engine at a ⅓ firing fraction will result in a repeating specific cylinder firing sequence of 24 when most evenly spaced firings are used—which corresponds to 3 engine cycles. Thus, the same cylinder firing sequence repeats every 3 engine cycles. A most evenly spaced firing sequence associated with a firing fraction of x/5 will repeat over 5 engine cycles, the sequence associated with a firing fraction of x/7 would repeat over 7 engine cycles, etc. In contrast, when the pattern length is a mathematical factor of the number of cylinders, the engine cylinder pattern repeats every engine cycle (e.g., firing fractions of ½, x4, and x/8 each repeat every engine cycle in an eight cylinder engine).

It has been observed that the frequency of the repeating engine cycle sequences (i.e., the frequency of the repeating specific cylinder firing sequence) is another frequency of particular concern in some skip fire control schemes and/or parameter calculations. When the repeating engine cycle sequences are of concern, the averaging filter can be arranged to average values over the period of the repeating specific cylinder firing sequence length. For example, in the case of an 8 cylinder engine operating at a ⅓ firing fraction, the averaging period would be 3 engine cycles (i.e., 24 firing opportunities). A drawback of averaging over the course of repeating engine cycle sequence/specific cylinder firing sequence length is that the period of time that the parameter is averaged over can make the control less responsive, particularly when the averaging occurs over the course of several engine cycles. However, at steady state operation, averaging over the repeating engine cycle sequence can further improve control. By way of example, air charge calculations during steady state operation is one area that has been observed to further benefit from repeating engine cycle sequence averaging. In some implementations, repeating engine cycle sequence averaging can be used during extended steady state operation while other filtering techniques may be used during transitions and/or when any significant changes in operating conditions are observed.

It should also be appreciated that in some cases a skip-fire engine can be fired in firing patterns that do not correspond to most evenly spaced firings. The described averaging filter can still work; however, in this case the number of engine cycles in the repeating specific cylinder firing sequence may not correspond to the firing fraction denominator.

Although only a few embodiments of the invention have been described in detail, it should be appreciated that the invention may be implemented in many other forms without departing from the spirit or scope of the invention. For example, the term engine speed may refer to the rotational speed of the engine crankshaft or in some cases the rotational speed of a drive shaft or other power train component connected to the engine crankshaft. The connection may be rigid, i.e. locked up, or may have some slip as is typical in vehicles with a torque converter clutch. As previously mentioned, the tapped delay line illustrated in FIG. 5 is a FIR filter. However, in alternatively embodiments, infinite impulse response (IIR) filters can be arranged to provide similar performance—although they tend to be much larger and more complicated to design. By way of example, FIG. 8 illustrates the attenuation of a fourth order elliptical filter that heavily attenuates 25 Hz which can be compared to the performance of the FIR filter embodiment shown in FIG. 6.

It should be appreciated that the filter illustrated in FIG. 6 is a variable notch filter that has extremely good attenuation at the fundamental frequency associated with skip fire operation of an engine. That is, the frequency of the notches (maximum attenuation) vary with variations in the skip fire firing fraction such that outside of transitions, the notch is always tuned to the fundamental frequency associated with the current firing fraction. It should be appreciated that such a filter design is a particularly powerful tool for filtering out transient variations associated with skip fire operation of the engine making it particularly useful in skip fire engine control.

Although firing sequence length and repeating engine cycle length averaging are the primary described embodiments, it should be apparent that the described techniques can be used to average over any period of concern. It should be apparent that in many instances, the averaging period is something different than the period of an engine cycle.

The invention has been described primarily in the context of skip fire control since skip fire control is the focus of the Applicant. However, it is believed that the same techniques can also be very useful in the control of variable displacement engines and other engine control schemes that contemplate firing less than all of the cylinders at times and/or operating an engine in a manner in which all cylinders are not delivering the same output (e.g., when some cylinders are arranged or controlled to have a greater torque output than others). In any of these operational modes, the engine is effectively operated at different firing fractions having different fundamental frequencies associated therewith. Therefore, the present embodiments should be considered illustrative and not restrictive and the invention is not to be limited to the details given herein, but may be modified within the scope and equivalents of the appended claims.

What is claimed is:

1. A method comprising:

operating an engine in an operating mode having a plurality of different effective firing fractions;

measuring an engine operating parameter during the operation of the engine at a current firing fraction having an effective firing fraction of less than one;

averaging the measured operating parameter over a period that is based on and varies with changes in at least one of (i) a denominator of the current firing fraction, and (ii) a repeating firing sequence length associated with the current firing fraction; and using the averaged measured operating parameter as the value of the measured operating parameter in an engine control calculation or operation during the operation of the engine.

2. A method as recited in claim 1 wherein the averaging period varies with changes in the operational firing fraction in accordance with a denominator of the then current firing fraction.

3. A method as recited in claim 1 wherein the averaging period is a repeating specific cylinder firing sequence length.

4. A method as recited in claim 3 wherein the measured operating parameter is an intake air measurement or an operating parameter used in the calculation of a mass air charge (MAC).

5. A method as recited in claim 1 wherein the measured operating parameter is selected from the group consisting of:

engine speed;

an intake air measurement; and a cam or camshaft position or speed measurement.

6. A method as recited in claim 1 wherein the measured operating parameter is an operating parameter used in the calculation of cylinder air charge.

7. A method as recited in claim 1 wherein the measured operating parameter is an operating parameter used in the calculation the firing fraction currently in use.

8. A method as recited in claim 1 wherein:

the engine has a plurality of cylinders and is operated in a skip fire mode, wherein during skip fire operation, the engine is operated at a plurality of different firing fractions, each operational firing fraction including a numerator and a denominator, wherein the available firing fractions include a firing fraction of one half, at least one firing fraction having a denominator of three, and at least one firing fraction having a denominator of four, each firing fraction being an irreducible fraction;

the period that the operating parameter is averaged over is selected from the group consisting of (i) a number of firing opportunities equal to the denominator of the current firing fraction, and (ii) a least common multiple of the denominator of the firing fraction and the number of engine cylinders.

9. A method as recited in claim 1 wherein the measure operating parameter is selected from the group consisting of:

engine speed;

an intake air measurement selected from the group consisting of intake manifold pressure (MAP) and intake mass airflow (MAF);

a cam or camshaft position or speed measurement; and an operating parameter used in the calculation of a mass air charge (MAC).

10. A method comprising:

operating an engine in a skip fire operating mode having a plurality of different available operational firing fractions of less than one;

measuring an engine operating parameter during the operation of the engine at a current firing fraction that is less than one;

averaging the measured operating parameter over a period that is based on the current firing fraction wherein the averaging period varies with changes in the operational firing fraction in accordance with a denominator of the then irreducible firing fraction; and using the averaged measured operating parameter as the value of the measured operating parameter in an engine control calculation or operation during the operation of the engine.

11. A method as recited in claim 10 wherein the current firing fraction is an irreducible fraction having a numerator and a denominator and the averaging period is a number of firing opportunities equal to a denominator of the current firing fraction, wherein the averaging period is the same for a given firing fraction denominator regardless of the firing fraction numerator.

12. A method as recited in claim 10 wherein the plurality of different operational firing fractions include first, second and third selected firing fractions, the first and second selected firing fractions having different numerators but the same denominator and the third selected firing fractions having a different denominator than the first and second selected firing fractions, whereby the averaging period for the first and second selected firing fractions is the same and the averaging period for the third selected firing fraction is different than the averaging period for the first and second selected firing fractions.

13. A method as recited in claim 10 wherein the available firing fractions include at least one firing fraction having a denominator of two, at least one firing fraction having a denominator of three and at least one firing fraction having a denominator of four, each firing fraction being an irreducible fraction.

14. A skip fire engine controller arranged to control operation of an engine in a skip fire mode, wherein the controller facilitates skip fire operation of the engine at a multiplicity of different operational firing fractions, the skip fire controller being arranged to:

receive a sample of a selected engine operating parameter at a sample rate of once per firing opportunity or an integer multiple thereof;

average the sampled operating parameter over a period that is based on a then current firing fraction, wherein the averaging period varies with selected changes in the operational firing fraction; and use the averaged sampled operating parameter as the value of the sampled operating parameter in an engine control calculation or operation during skip fire operation of the engine.

15. A skip fire engine controller as recited in claim 14 wherein a finite impulse response (FIR) filter performs the averaging.

16. A skip fire engine controller as recited in claim 14 wherein the averaging is accomplished by a filter arranged to receive the sample of the selected engine operating parameter, the filter comprising:

a tapped delay line having a multiplicity of taps, each tap corresponding to a denominator of a potentially available, irreducible skip fire firing fraction; and a selector arranged to receive the denominator of a current firing fraction as a selection input, wherein the output of the filter is based on the firing fraction.

17. A skip fire engine controller as recited in claim 14 wherein an infinite impulse response (IIR) filter performs the averaging.

18. A skip fire engine controller arranged to control operation of an engine in a skip fire mode, wherein the controller facilitates skip fire operation of the engine at a multiplicity of different operational firing fractions, each operational firing fraction being an irreducible fraction including a numerator and a denominator, the skip fire controller including a filter having a sample rate of once per firing opportunity or an integer multiple thereof, the filter comprising:

a tapped delay line having a multiplicity of taps, each tap corresponding to the denominator of a potentially available skip fire firing fraction; and a selector arranged to receive the denominator of a current firing fraction as a selection input, wherein the output of the filter is based on the firing fraction.

19. A skip fire engine controller as recited in claim 18 wherein the filter is implemented by a processor using code embedded in a tangible computer readable media.

* * * * *